(12) United States Patent
Pettersson

(10) Patent No.: US 8,516,711 B2
(45) Date of Patent: Aug. 27, 2013

(54) DEVICE FOR MARKING OR PROCESSING A SURFACE, TOOL, AND ARTICULATED ARM

(75) Inventor: Bo Pettersson, London (GB)

(73) Assignee: Leica Geosystems AG, Heerbrugg (CH)

( * ) Notice: Subject to any disclaimer, the term of this patent is extended or adjusted under 35 U.S.C. 154(b) by 279 days.

(21) Appl. No.: 13/058,192

(22) PCT Filed: Oct. 6, 2009

(86) PCT No.: PCT/EP2009/062968
§ 371 (c)(1),
(2), (4) Date: Feb. 28, 2011

(87) PCT Pub. No.: WO2010/040742
PCT Pub. Date: Apr. 15, 2010

(65) Prior Publication Data
US 2011/0173829 A1   Jul. 21, 2011

(30) Foreign Application Priority Data
Oct. 9, 2008   (EP) .................................... 08166207

(51) Int. Cl.
*G01B 5/008*   (2006.01)
(52) U.S. Cl.
USPC ......................................................... 33/503
(58) Field of Classification Search
USPC .................................. 33/503, 556
See application file for complete search history.

(56) References Cited

U.S. PATENT DOCUMENTS

| | | | |
|---|---|---|---|
| 4,782,726 A | 11/1988 | Ryder | |
| 5,926,782 A | 7/1999 | Raab | |
| 6,131,299 A * | 10/2000 | Raab et al. | 33/503 |
| 2003/0120377 A1 | 6/2003 | Hooke | |
| 2004/0026584 A1 | 2/2004 | Libbey | |
| 2005/0207857 A1 | 9/2005 | Jordil et al. | |
| 2006/0016086 A1* | 1/2006 | Raab et al. | 33/503 |
| 2010/0095542 A1* | 4/2010 | Ferrari | 33/503 |
| 2012/0222323 A1* | 9/2012 | Tait | 33/503 |
| 2012/0260512 A1* | 10/2012 | Kretschmer et al. | 33/503 |

FOREIGN PATENT DOCUMENTS

| | | |
|---|---|---|
| CN | 1670393 | 9/2005 |
| CN | 201077334 | 6/2008 |
| DE | 89 10 824 | 11/1989 |
| GB | 2 447 455 | 9/2008 |
| WO | 01/89771 | 11/2001 |
| WO | 02/22317 | 3/2002 |

* cited by examiner

*Primary Examiner* — G. Bradley Bennett
(74) *Attorney, Agent, or Firm* — Maschoff Brennan

(57) ABSTRACT

The invention relates to a device for marking or processing a surface at a predeterminable position, comprising: a marking or processing tool that is operable by hand; a manually operable articulated arm with at least two arm parts that are pivotably connected by a joint; a fitting at one end of the arm for releasably mounting the tool; and a sensor for measuring a setting of the joint; and a position indication unit for computing and indicating a position for the tool using the output signal of the sensor. The invention further relates to a tool and an articulated arm for the device for marking or processing a surface.

20 Claims, 4 Drawing Sheets

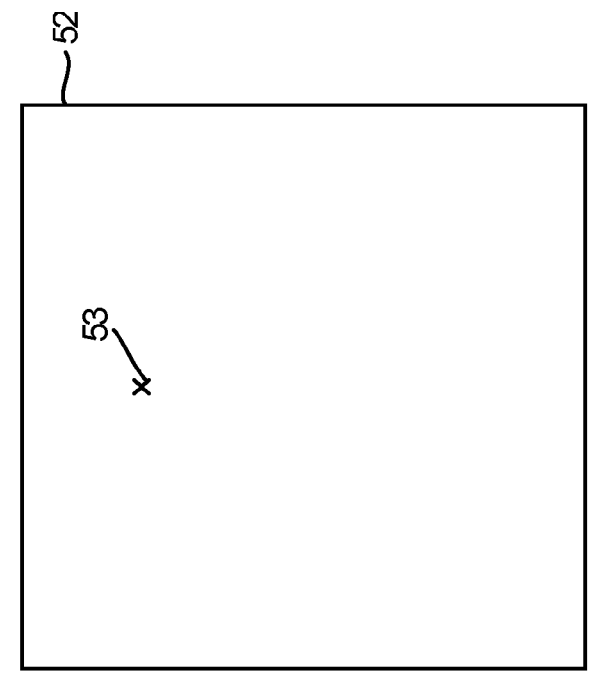
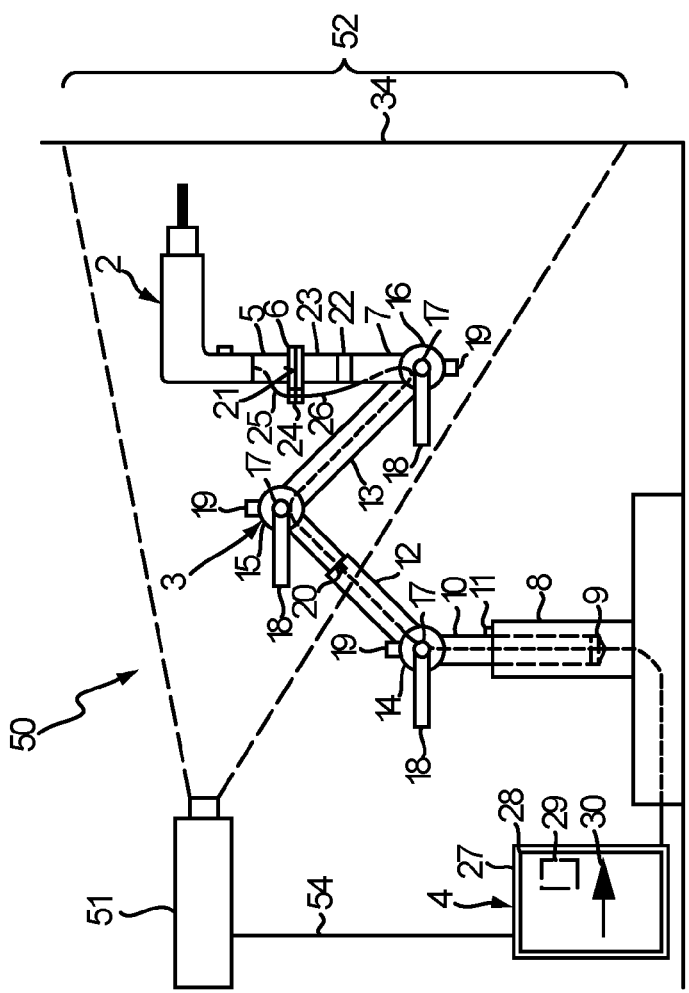

DEVICE FOR MARKING OR PROCESSING A SURFACE, TOOL, AND ARTICULATED ARM

The invention relates to a device for marking or processing a surface at a predeterminable position, as well as a tool and an articulated arm for such a device.

BACKGROUND

In surface processing, there was always a need for marking and processing a surface accurately. For example, when drilling holes, a measuring tool is employed to find a position at which the hole should be drilled. In today's solutions different kinds of measuring tools are used to find such a position and to make a mark for a hole before actually drilling the hole. The measuring tools employed usually are tapes or laser meters. Thus, there is a lot of manual work needed before the drilling can take place.

Also when sawing with a handsaw or a jigsaw, there is normally some need to have some line or marker to follow in order to saw at the right place. Just as above, there are several steps necessary to create appropriate marks or a line on a surface of an object prior to sawing.

In another example, a surface is grinded, sanded, or planed. At certain intervals the surface is measured and depending on the measured results the grinding, sanding, or planing is continued or ended. These repeated measurements also consume a lot of time.

The same applies to routers. In order to establish a track several measuring steps have to be performed in order to generate the right path.

Thus, it is necessary to complete several measuring steps before a surface can be marked or processed. This requires the use of additional tools and consumes a significant amount of time. Also the measuring is at times not accurate enough.

SUMMARY

The objects of the present invention are, therefore, to provide a device for marking or processing a surface that enables the task to be done more precise, quicker and without the need for additional measuring instruments and measurement steps, as well as a tool, and an articulated arm for such a device.

The invention, in its various aspects, is as set out in the appended claims.

The device for marking or processing a surface at a predeterminable position at a predeterminable position comprises a marking or processing tool that is operable by hand; a manually operable, non-supporting articulated arm with at least two arm parts that are pivotably connected by a joint, wherein—at least in a first operation mode—the joint provides for substantially resisting force-free and supporting force-free rotary movability; a fitting at the distal end of the arm for releasably mounting the tool; and a sensor for measuring a setting of the joint; and a position indication unit for computing and indicating a position for the tool using an output signal of the sensor.

The device is an especially advantageous combination of a coordinate measuring machine and a tool for marking or processing a surface. Coordinate measuring machines with articulated arms are well known in the prior art. They usually comprise a stylus that is attached to an end of an articulated arm, wherein the stylus is equipped with a ruby ball at its distal, free end. To measure coordinates of an object the ruby ball is brought into contact with the object and can also be moved along the surface of the object. Thus coordinates of the object are calculated from the displacement of the ruby ball from a known reference point. The measured coordinates may preferably be compared with a model or a drawing. With a standard coordinate measuring machine the surface of an object is not altered in any way.

The idea of the present invention is to attach a tool for marking or processing a surface to the articulated arm of a coordinate measuring machine. The device continuously determines the position of the tool and informs the user of any deviations from the predetermined position. Thereby, a user is enabled to carry out his marking or surface processing tasks immediately without having to measure the surface beforehand and to apply markings to the object at predetermined positions.

In a preferred embodiment, the fitting comprises a decoupling element. The decoupling element is provided to protect the sensor of the articulated arm. The sensor is preferably an optical sensor, e.g. an angle encoder, which is sensitive to movements and can easily be destroyed by strong vibrations or torsions generated by the tool.

The decoupling element may be a dampening element. The dampening element greatly reduces any vibrations or sudden movements that may originate from the tool. The dampening element may be an elastic element preferably made of rubber or silicone. The elastic element may be ring shaped.

In another preferred embodiment, the decoupling element is a connecting element that is partially lockable to enable movements of the tool with one degree of freedom only. Such a decoupling element may be engaged once the tool has reached a predetermined position in order to perform a certain task, e.g. drilling a hole. It is very advantageous if the articulated arm and the sensors attached to the arm would not be subjected to the forces needed to push the drilling machine in the drilling direction because otherwise the accuracy of the position reading would be impaired and the sensor of the arm would not be protected.

According to another preferred embodiment, the arm comprises several joints, wherein—at least in the first operation mode—all of the joints provide for substantially resisting force-free and supporting force-free rotary movability. Particularly, e.g. in a second operation mode, the stiffness of at least one of the joints can also be adjustable. Providing several joints for the arm enables movements of the arm within a greater range and with more degrees of freedom. Preferably the tool is moveable with six degrees of freedom. The stiffness of a joint can be adjustable within the limits of being freely moveable to not being movable at all. Dependent on the chosen stiffness, the arm could also be able to support the tool at the desired position, i.e. the arm would function as a tool holder. However, in case of choosing a stiff adjustment for a joint, a precise measurement of its setting cannot be guaranteed e.g. because of the stick slip effect. Therefore, according to the invention, the joints of the arm—at least in one operation mode—provide for substantially resisting force-free and supporting force-free rotary movability of the arm-parts relative to each other, as known from articulated arm CMMs of the generic type.

According to a more specified embodiment, the joints of the arm can also be—e.g. in a third operation mode—selectively lockable in order to restrict the moveability of the distal end—and also of the tool being mounted to the fitting at the distal end—to one or some specific desired degrees of freedom, particularly to a plane. This would enable a user to move the tool at a predetermined distance from a wall or above a ground.

The tool may be a marker or a power tool, in particular a drilling machine, sawing machine, a grinding machine, a sanding machine, a planer or a router. All of these tools require accurate positioning and preferably also adequate orientation alignment in order to mark or shape a surface in a desired manner.

Preferably, the tool is mountable to the fitting using a quick-fit connection. The tool can thus be quickly exchanged for another tool in order to continue the work.

The quick-fit connection may include an electrical coupling for supplying electrical power to the tool. Thus, once the tool has been connected to the fitting, is will also be supplied with electrical power. There is no longer a need for an additional step of plugging-in the tool.

A connecting element of the tool may also be equipped with some kind of identification means that may be read electrically or electronically by the position indication unit once the tool is attached to the fitting. The quick-fit connection needs, therefore, to be connected to the position identification unit. Thus, the position identification unit is provided with the correct offset of the tool as soon as it is mounted. Such identification means are well known in the art, e.g. to identify hardware components of a personal computer.

An orientation of the tool may be indicatable by the position indication unit. According to this embodiment, the user is not only able to find the desired position for the tool to begin the marking or surface processing task, but he is also told in which orientation to hold the tool. Thus he can for example drill holes that are perpendicular to the surface as well. In a preferred embodiment, the direction that the tool should be moved in is indicatable. This can be achieved by projecting a line onto the surface to be processed. When sawing the user simply has to move his tool further along that line.

The position indication unit may include a memory unit for storing several positions and/or orientations of tool. Hence, the device may be programmed to show a sequence of several predetermined positions. Thus, more complex objects may be worked on or more difficult movements of the tool may be performed, such a sawing a circle.

The position indication unit may include a personal digital assistant (PDA). Such personal digital assistants are currently widely available and usually comprise a programmable processing unit with a large memory as well as a touch-sensitive graphical user interface along with several other interfaces for attaching other hardware, such as an articulated arm. These personal digital assistants are cheap and easy to program and use. Thus, they can be used to enter coordinates of predetermined positions into the position indication unit and to display information to the user.

The position indication unit may also include a laser beam generator. This laser beam generator may be attached to the fitting. Suitable laser beam generators comprise a laser diode. There may also be beam guiding means in order to point the laser beam to a desired position on a surface. Furthermore, the laser beam generator may be configured to generate a laser beam line. Such a laser beam line can be advantageously used to indicate a direction in which the tool should be moved.

A speaker may be connected to the position indication unit for providing position indications by speech and/or sound. Thus, a user could be instructed on how to move the tool by voice messages, such as "Move the tool to the right!" or by a sequence of sounds.

Preferably, the arm is telescopically extendable for enlarging the range of operation of the device. The part or the arm that is extendable should be equipped with a length sensor to measure the degree of extension. The output signal of the length sensor would then be fed into the position indication unit in order to determine the correct position of the tool.

The position indication unit may also comprise an image projector. The projector would illuminate at least a part of the surface to be processed. An image, e.g. in the form of a dot, a line, a cross, or a circle would be projected onto the surface to indicate the predetermined position. The projector would also be able to indicate several positions as well as directions for tool movements.

The invention further comprises a tool for a device for marking of processing a surface. The tool is provided with a connecting element for mounting the tool to a fitting of an articulated arm.

The invention further comprises an articulated arm for a device for marking or processing a surface. The arm is manually operable comprises at least two arm parts that are pivotably connected by a joint; a tool fitting at one end of the arm for releasably mounting a marking or processing tool; and a sensor for measuring a setting of the joint.

The device may be calibrated by moving the tool to at least one calibration position. The calibration position is used to reset the readings of the sensors of the arm.

The device may also be operated in a teaching mode. In this mode a marking tool or a probe is attached to the fitting. The marking tool or probe is moved to at least one predetermined position or along a line; either of which is stored in the memory unit of the position indication unit. The tool is then exchanged for a power tool to process the surface at the predetermined position, e.g. to saw along a line.

The invention further relates the use of a manually operable articulated arm coordinate measuring machine (CMM) for predeterminably positioning of a marking or processing tool being operable by hand, so as to enable for marking or processing a surface at a desired surface position. Therein the articulated arm coordinate measuring machine—conforming to its genre—comprises at least two arm parts that are pivotably connected by a joint, wherein the joint provides for substantially resisting force-free and supporting force-free rotary movability, and a sensor for measuring a setting of the joint.

The use is achieved by mounting the tool onto a distal end of the articulated arm coordinate measuring machine and computing and indicating a position for the tool—using the output signal of the sensor—in such a precise way, that the tool marks or processes the surface at the desired, precisely defined surface position, e.g in order to drill a borehole into a wall at a precisely defined position of the wall.

Summed up, the invention relates to a device for marking or processing a surface at a predeterminable position, comprising:
- a marking or processing tool that is operable by hand,
- a manually operable articulated arm with at least two arm parts that are pivotably connected by a joint, a fitting at one end of the arm for releasably mounting the tool and a sensor for measuring a setting of the joint and
- a position indication unit for computing and indicating a predetermined position for the tool using the output signal of the sensor.

BRIEF SUMMARY OF THE FIGURES

The invention will now be explained in detail by referring to exemplary embodiments that are shown in the drawings, in which:

FIG. 3 is a side view of the device according to a second embodiment;

FIG. 4 is a front view of an illuminated section; and

DETAILED DESCRIPTION OF SEVERAL EMBODIMENTS

The principles of the embodiments described herein show the structure and operation of several examples used to illustrate the present invention. It should be understood that the drawings are diagrammatic and schematic representations of such example embodiments and, accordingly, are not limiting the scope of the present invention, nor are the drawings necessarily drawn to scale.

Figure 1:
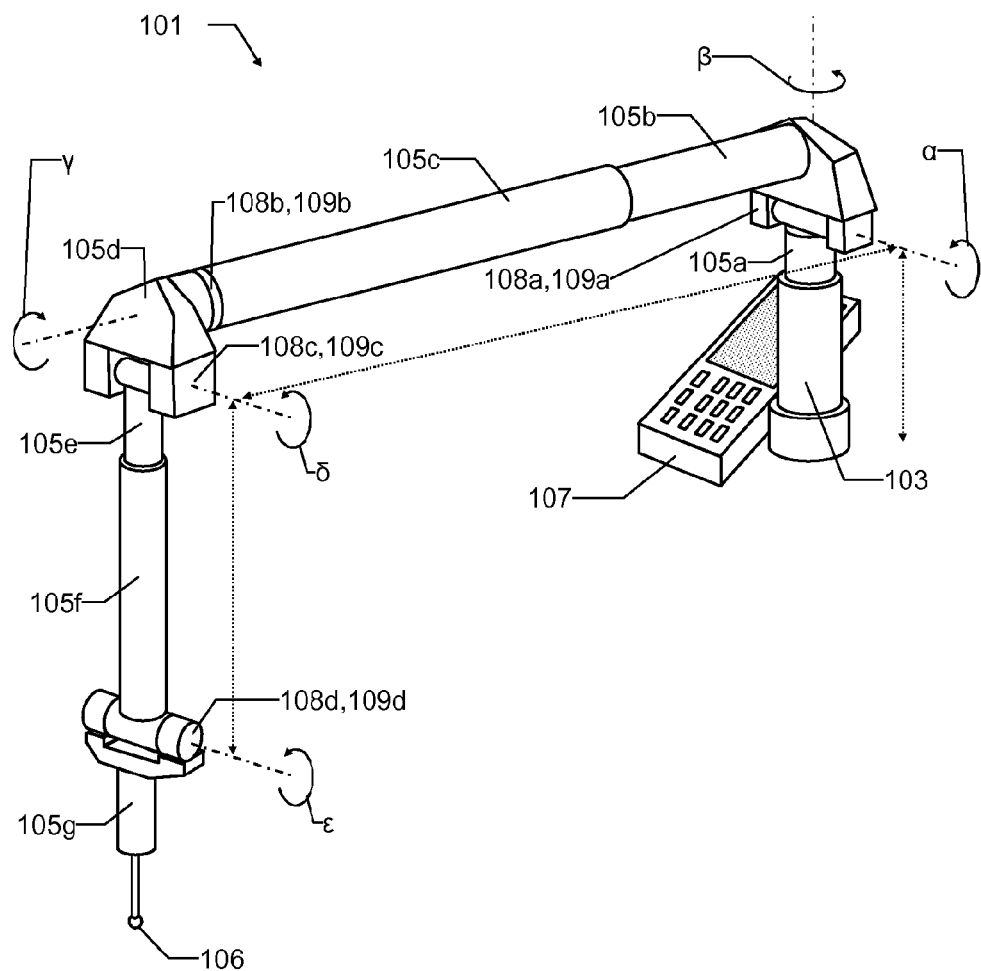
FIG. 1 shows an articulated arm CMM according to the state of the art.

FIG. 1 shows an articulated arm CMM 101 according to the state of the art. The CMM is designed for determining a measuring position of the probe 106. Therefore, the articulated arm CMM 101 comprises a base 103 which forms the support of the CMM and which can be positioned onto a surface, particularly a floor or a table. Connected to the base 3 several arm-components 105a-105g are linked by hinge and swivel joints 108a-108d, thus, the arm-components 105a-105g being movable relative against each other. Therein, the joints provide for substantially resisting force-free and supporting force-free rotary movability, so as to enable precise measurement of the actual relative setting of each joint.

A first arm-component 105a is linked with and movable relative to the base 103, a second arm-component 105b is linked with and movable relative to the first arm-component 105a, and so on. The last arm-component 105g—which forms the end of the articulated arm—has attached a probe 106, thus, the probe 106 being freely movable within a given volume. For example, the probe 106 is manually operable by a user and may be designed as a ruby ball in order to be build for contacting a surface point to be measured.

Furthermore, sensing units 109a-109d are allocated to the hinge and swivel joints 108a-108d, the sensing units 109a-109d being formed for measurement of an actual relative setting of each of the joints 108a-108d. Thereby, the sensing units 109a-109d are, for example, installed in the housings of the corresponding joints 108a-108d. For example, optoelectronic angle sensors are used as the sensing units to measure an actual angle $\alpha$, $\beta$, $\gamma$, $\delta$, $\epsilon$ between two arm-components linked by the corresponding joint.

The measured actual setting of each joint 108a-108d is transmitted to a computing unit 107. By combining the relative settings of each joint 108a-108d, the computing unit 107 calculates the internal position of the probe 106—respectively the position of the point being touched by the probe 106—relative to the base 103 of the coordinate measuring machine 101. For example, the coordinates of the calculated internal position relative to the base 103 may be displayed on a display of the computing unit 107.

According one aspect of the invention, the manually operable articulated arm coordinate measuring machine (CMM) can be used for predeterminably precisely positioning of a marking or processing tool being operable by hand, so as to enable for marking or processing a surface exactly at a desired, precisely defined surface position.

The corresponding use of the articulated arm CMM is achieved by mounting the tool onto a distal end of the articulated arm coordinate measuring machine and computing and indicating a position for the tool—using the output signal of the sensor—in such a way, that the tool marks or processes the surface at the desired surface position.

As explained in more detail in the following, the distal end of the arm may comprise a fitting or a receptacle for the tool, so that the tool can easily be mounted and fixed to the end of the articulated arm CMM.

Figure 2:
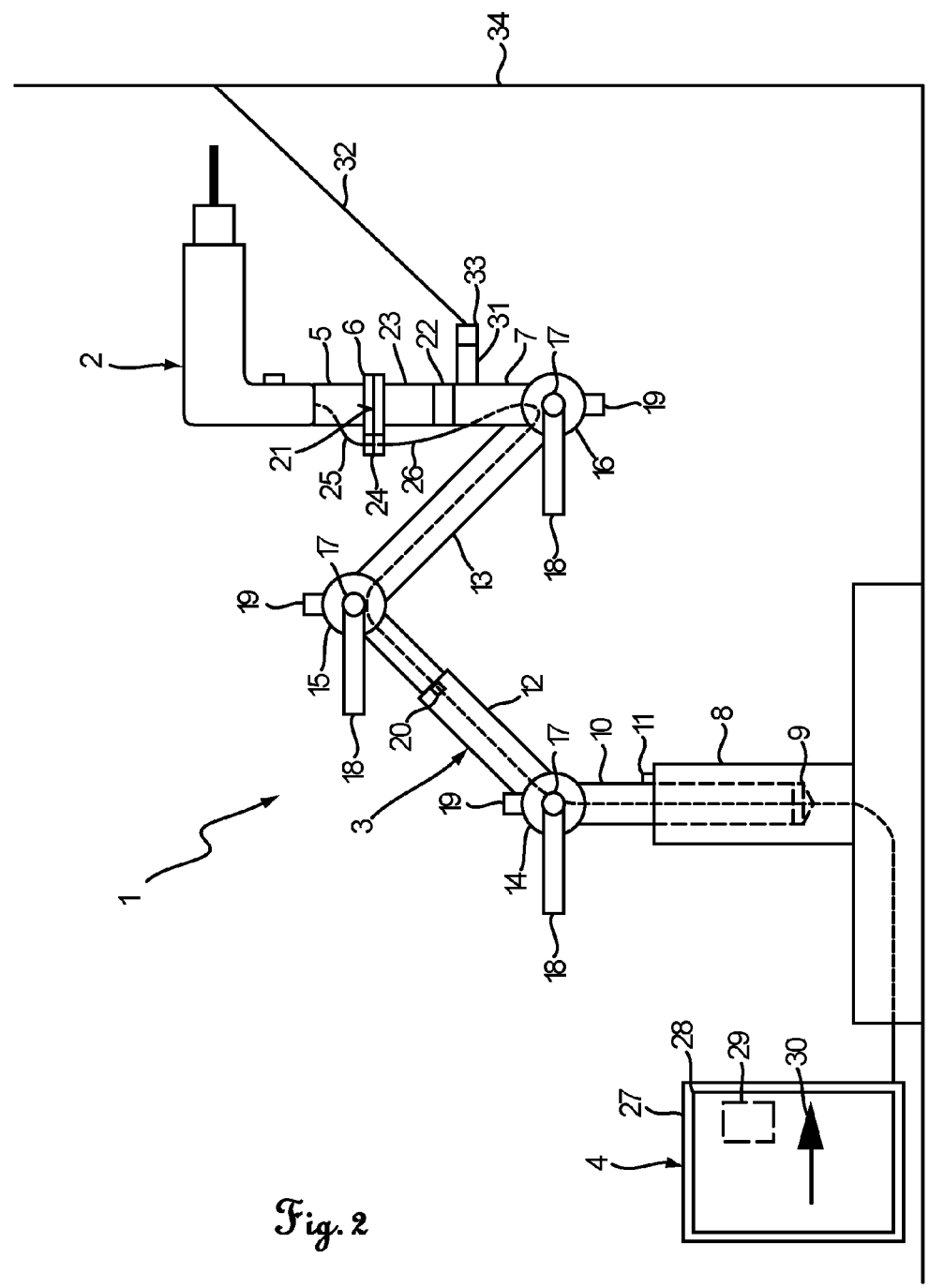
FIG. 2 is a side view of the device according to a first embodiment.

In FIG. 2, a device 1 for marking or processing a surface according to the invention is shown in an inside scenario. A tool 2 is attached to an articulated arm 3. The articulated arm 3 is connected to a position indication unit 4.

The tool 2 is a power tool operable by hand, in this embodiment a drilling machine, but the tool could also be any other marking or power tool, e.g. a sawing machine, a grinding machine, a sanding machine, a planer, or a router. The tool 2 is equipped with a connecting element 5 which is part of a quick-fit connection 6. With this connecting element 5 the tool 2 is releasably mountable to a fitting 7 of the articulated arm 3.

The manually operable articulated arm 3 comprises a pedestal 8 as a base. The pedestal 8 is provided with a borehole 9 into which a first arm part 10 of the articulated arm 3 is inserted. The arm part 10 may be turned in the borehole. A turn sensor 11 is provided to determine the turn setting of the articulated arm 3 in the borehole 9. The articulated arm 3 comprises a total of three arm parts 10, 12, 13 that are pivotably connected at their ends by joints 14-16. The joint 16 that the fitting 7 is attached to is a spherical joint. The pivoting movement of the joints 14-16 can be restricted or locked into position by tightening screw elements 17. Levers 18 are provided to operate the screw elements 17. Each joint 14-16 is equipped with a sensor in the form of an optical angle encoder 19 for measuring a setting of the joint 14-16. The angle encoders 19 are connected with wires (not shown) to the position indication unit 4. The arm part 12 in the middle is extendable to increase the range of the articulated arm 3. The middle arm part 12 has an extension sensor 20 to measure the degree of extension of the articulated arm 3. The extension sensor 20 is connected to the position indication unit 4. The fitting 7 at the end 21 of the articulated arm 3 that is opposite of the pedestal 8 exhibits a decoupling element 22 in form of a dampening element. The fitting 7 is further provided with another connecting element 23 as part of the quick-fit connection 6 for attaching the tool 2 to the articulated arm 3. The quick-fit connection 6 further comprises an electrical coupling 24 for supplying electrical power to the power tool 2. A suitable quick-fit connection with an electrical coupling has been described in detail in the European patent specification EP 1 577 050 B1. Power cords 25, 26 are attached to both ends of the electrical coupling 24 and lead to the power tool 2 and the position indication unit 4.

The position indication unit 4 is connected to the sensors 11, 19, 20 of the articulated arm 3. The position indication unit 4 comprises a personal digital assistant 27 that is equipped with a large touch-sensitive display 28 that covers almost the entire front of the position indication unit 4 and a memory unit 29 for storing several positions of the tool 2. Coordinates of predetermined positions can be entered into the position indication unit 4 using the touch-sensitive display 28. On the display 28, position, orientation, and direction information can be displayed—preferably in the form of arrows 30—to enable a user to move the tool 2 precisely to at least one predetermined position. In this embodiment, the position indication unit 4 is further configured to control the power supply to the power tool 2. The position indication unit 4 is also connected to a laser beam generator 31 that is attached to the fitting 7. The laser beam 32 is generated by a laser diode and is guided by laser beam guiding means 33, e.g. moveable lenses, mirrors or a scanner wheel. The laser beam generator 31 indicates a position on a wall 34 at which a hole is to be drilled. The laser beam generator 31 is further configured to generate a laser beam line and can also display characters or numbers on the wall.

Referring now to FIG. 3, a second embodiment of the device 50 for marking or processing a surface is shown. Instead of a laser beam generator this embodiment comprises a projector 51 which illuminates a section 52 of the wall 34, a front view of which is shown in FIG. 4. Predetermined positions for the tool 2 are depicted in the form of images 53, in this case a cross, within the illuminated section 52. The projector 51 is connected by cable 53 to the position indication unit 4.

Figure 5:
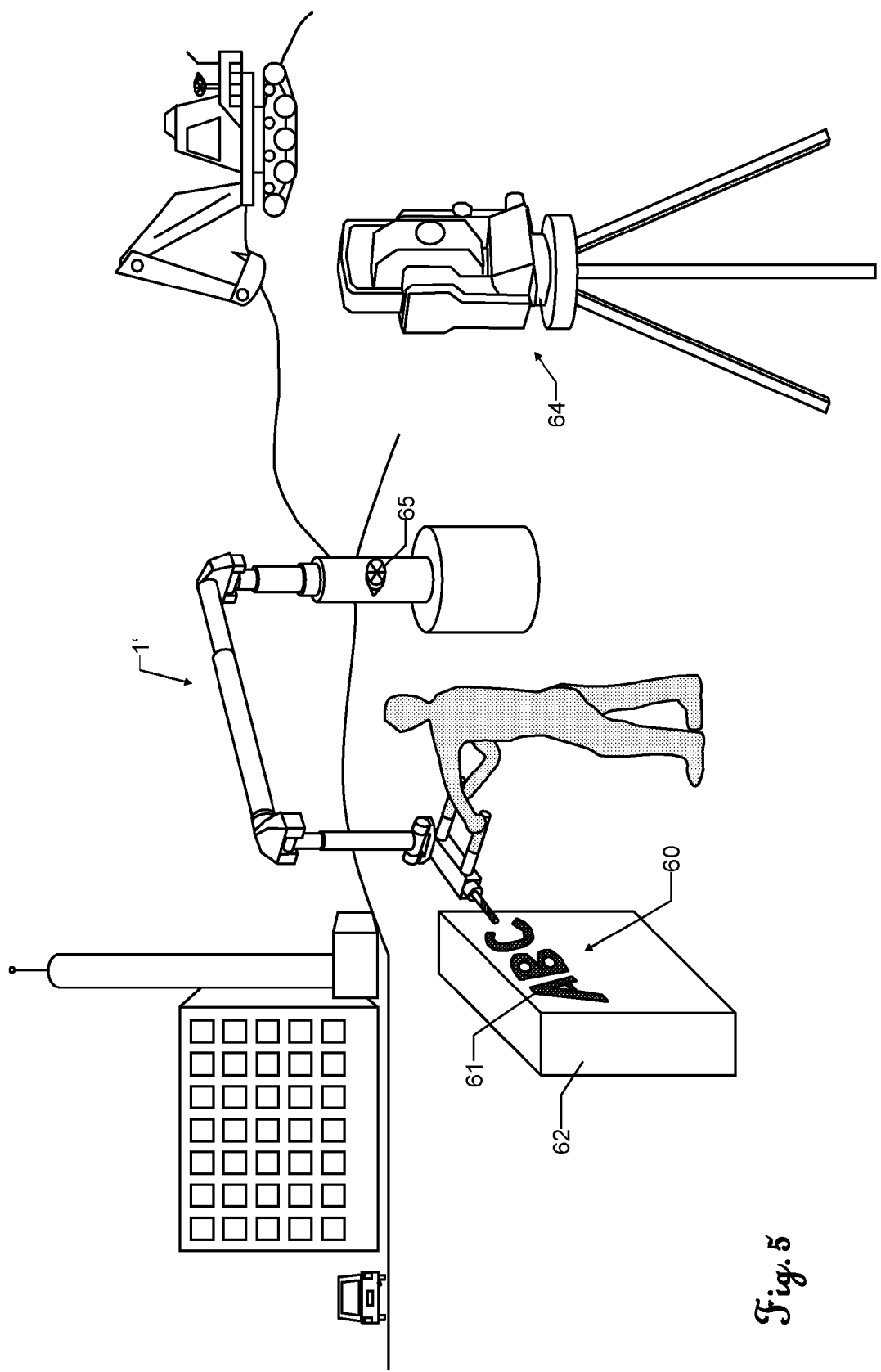
FIG. 5 shows an outside use of the device for marking or processing according to the invention.

FIG. 5 shows an outside use of the device for marking or processing 1' according to the invention—e.g. on a construction site. One application of the device 1' is drilling holes into a surface or directly processing a surface in a predefined way. Exemplarily, in order to precisely place letters 61 of a company logo 60 onto a wall 62, several holes have to be drilled into the wall 62 accurately, the wall 62 already being surveyed and stored in a computer model of the construction side.

According to the invention, the device for marking or processing 1' is used for drilling the holes accurately at predetermined positions. The base of the device is referenced in the coordinate system of the computer model by measuring the external position thereof e.g. using a total station 64. Therefore, the base of the device 1 can comprise means for measuring the external position, e.g. a retro-reflector 65 or corner cube to allow accurate determination of the device-position in the external coordinate system. Alternatively, a global positioning system sensor (GPS-position sensor) may be installed in the base of the device 1' in order to reference the device 1' for marking or processing in the computer model coordinate system.

What is claimed is:

1. A device for marking or processing a surface at a predeterminable position, comprising:
    a marking or processing tool that is operable by hand;
    a coordinate measuring machine including:
        a manually operable, non-supporting articulated arm including:
            at least two arm parts that are pivotal connected by at least one joint, the joint providing for substantially resisting force-free and supporting force-free rotary movability,
            a fitting at a distal end of the arm for releasably mounting the tool; and
            a sensor for measuring a setting of the at least one joint; and
    a position indication unit for computing and indicating a predetermined position for the tool using the output signal of the sensor;
    wherein at least one of the at least one joint is adjustable in its stiffness within the limits of being freely moveable to not being movable at all.

2. A device according to claim 1, wherein the fitting comprises a decoupling element.

3. A device according to claim 1, wherein the fitting comprises a decoupling element with a damping element.

4. A device according to claim 2, wherein the decoupling element is a connecting element that is partially lockable to enable movements of the tool with one degree of freedom only.

5. A device according to claim 1, wherein the device comprises means for measuring a position of the device in an external coordinate system.

6. A device according to claim 1, wherein the device comprises a retro-reflector or a global positioning system sensor.

7. A device according to claim 1, wherein the arm comprises several joints, wherein at least in a first operation mode all of the joints providing for substantially resisting force-free and supporting force-free rotary movability.

8. A device according to claim 1, wherein the tool is a marker or a power tool.

9. A device according to claim 1, wherein the tool includes a drilling machine, a sawing machine, a grinding machine, a sanding machine, a planer or a router.

10. A device according to claim 1, wherein the tool is mountable to the fitting using a quick-fit connection.

11. A device according to claim 10, wherein the quick-fit connection includes an electrical coupling for supplying electrical power to the tool.

12. A device according to claim 1, wherein an orientation of the tool is indicatable by the position indication unit.

13. A device according to claim 1, wherein an orientation of tool and a direction in which the tool should be moved is indicatable by the position indication unit.

14. A device according to claim 1, wherein the position indication unit includes a memory unit for storing several positions and/or orientations of tool.

15. A device according to claim 1, wherein the position indication unit comprises a personal digital assistant.

16. A device according to claim 1, wherein the position indication unit comprises a laser beam generator.

17. A device according to claim 16, wherein the laser beam generator is configured to generate a laser beam line.

18. A marking or processing tool for a device according to claim 1, the tool being provided with a connecting element for mounting the tool to a fitting of an articulated arm.

19. A manually, operable, non-supporting articulated arm for a device according to claim 1, comprising:
    at least two arm parts that are pivotably connected by at least one joint, the at least one joint providing for substantially resisting force-free and supporting force-free rotary movability;
    a tool fitting at one end of the arm for releasably mounting a marking or processing tool; and
    a sensor for measuring a setting of the joint;
    wherein at least one of the at least one joint is adjustable in its stiffness within the limits of being freely moveable to not being movable at all.

20. A method of using a manually operable articulated arm coordinate measuring machine including at least two arm parts that are pivotably connected by at least one joint, the at least one joint providing for substantially resisting force-free and supporting force-free rotary movability, and a sensor for measuring a setting of the at least one joint, for predeterminably positioning of a marking or processing tool being operable by hand, so as to enable for marking or processing a surface at a desired surface position, the method comprising:
    mounting the tool onto a distal end of the articulated arm coordinate measuring machine; and
    computing and indicating a position for the tool using the output signal of the sensor in such a way, that the tool marks or processes the surface at the desired surface position.

* * * * *